United States Patent Office 2,744,110
Patented May 1, 1956

2,744,110
3-ETHYLENE MERCAPTOLE DERIVATIVES OF PROGESTERONE

Jack W. Ralls, Morton Grove, Ill., assignor, by mesne assignments, to G. D. Searle & Co., Skokie, Ill., a corporation of Delaware No Drawing. Application April 22, 1954,
Serial No. 425,023

1 Claim. (Cl. 260—239.5)

My present invention relates to a new group of mono-mercaptoles of polyketosteroids and, more specifically, to 3-ethylene mercaptoles of 4-pregnene-3,20-diones. The compounds which constitute my invention can be represented by the general structural formula

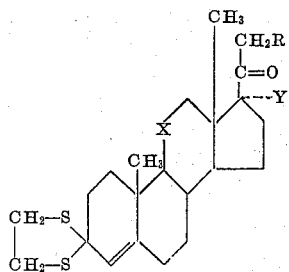

wherein X is a member of the class consisting of methylene, carbinol, and carbonyl radicals, Y is a member of the class consisting of hydrogen and hydroxyl and R is a member of the class consisting of hydrogen, hydroxyl and esterified hydroxyl radicals.

As shown in the foregoing structural formula, the 11-position in these pregnene derivatives can be either unsubstituted or substituted by a hydroxy or keto radical. The 17α-position can be occupied either by a hydrogen or a hydroxyl radical. The 21-position can be occupied by a hydrogen, a hydroxyl or an esterified hydroxyl group. For the purposes of my invention, I prefer esters of hydrocarbon carboxylic acids containing 1 to 9 carbon atoms such as formic, acetic, propionic, butyric, valeric, caproic, cyclohexaneacetic, cyclopentane-propionic and benzoic acid. Also within the scope of my invention are the 18- and 19-normethyl analogs of these 3-mercaptoles of 3,20-diketopregnenes.

The ease of formation and chemical stability of mercaptoles makes these compounds attractive intermediates in multi-stage syntheses. The studies of Hauptmann (Jour. Amer. Chem. Soc., vol. 69, 562; 1947) and of Ruff and Reichstein (Helvetica Chimica Acta, vol. 34, 70: 1951) on the reaction of steroid ketones with ethanedithiol have demonstrated that this dimercaptan group will condense with carbonyl functions at the 3-, 7-, 12-, 17- and 20-positions; the hindered 11-position is the only site of unreactivity. This situation has been used to advantage in the selective formation of 7-mercaptoles from 7,11-diones and 12-mercaptoles from 11,12-diones. A higher order of selectivity is required when the competitive reaction is between the 3- and 20-positions. In my copending application Serial No. 277,733, filed March 20, 1952, issued August 17, 1954 as U. S. Patent 2,686,789, I have shown that steroid ketones condense with ethandithiol under very mild conditions, i. e., acetic acid as a solvent and p-toluenesulfonic acid as a catalyst. When these conditions are used with di- and tri-ketones, reaction can be made to take place primarily at the 3-position in preference to the 17- and 20-position.

The compounds of my invention are valuable intermediates in the synthesis of oxo steroids permitting protection of the 3-oxo group while other oxo groups undergo chemical conversions. The 3-ethylene mercaptole group is conveniently converted to a 3-keto group by treatment with mercuric chloride and cadmium carbonate in aqueous acetone. However, the utility of these compounds is not limited to their use as intermediates in organic synthesis. Conversion of the 3,20-diketopregnenes such as corticosterone, 17-hydroxycorticosterone, cortisone, progesterone, 11-hydroxyprogesterone, 17-hydroxyprogesterone, 11,17-dihydroxyprogesterone and 11-desoxycorticosterone to the 3-ethylene mercaptoles leads to a profound change in pharmacological properties. Some of the pharmacological properties of the 3-ketosteroid are lost entirely while other activities are maintained. This makes the new compositions of matter useful where the prevalence of side reactions limits the specific utility of the 3-ketosteroid. As a typical example, cortisone 3-ethylene mercaptole lacks many of the other effects of cortisone but is an active lympholytic agent. Not only does blocking of the 3-oxo group by the ethylene mercaptole groups abolish some of the pharmacological properties of the 3-oxo steroids, but some of the properties are actually reversed. Thus, the 3-ethylene mercaptole derivative of progesterone serves as a non-estrogenic progesterone inhibitor.

The following examples illustrate in further detail some of the compounds which constitute my invention and methods for their synthesis. However, the invention is not to be construed as limited in spirit or in scope by the details set forth therein. It will be apparent to those skilled in the art that numerous modifications in materials and in methods can be adopted without departing from the invention in spirit or in scope. In these examples, quantities of materials are indicated as parts by weight.

Example 1

To a solution of 12.06 parts of cortisone acetate in 263 parts of warm acetic acid are added 2.46 parts of ethanedithiol and a solution of 2.7 parts of p-toluenesulfonic acid monohydrate in 32 parts of acetic acid. The mixture is maintained at room temperature for 15 hours after which the solid precipitate is collected on a filter and recrystallized from acetone to yield 17α-hydroxy-21-acetoxy-4-pregnene-3,11,20-trione 3-ethylene mercaptole melting at about 256–258° C. An 0.5% chloroform solution shows a rotation of $[\alpha]_D = +210°$. The infrared absorption spectrum as determined in a potassium bromide disc shows maxima at about 2.96, 5.74, 5.82, 5.95, 7.30, 7.91, 8.0, and 9.52 microns.

To a solution of 4.4 parts of this crystalline material in 750 parts of 95% methanol, there are added in the course of 15 minutes 88 parts of 0.5-N methanolic potassium bicarbonate solution with shaking. The reaction mixture is permitted to stand at room temperature for 16 hours and then acidified with dilute acetic acid and concentrated under vacuum. On cooling, 17α,21-dihydroxy-4-pregnene-3,11,20-trione 3-ethylene mercaptole is obtained which, recrystallized from a mixture of acetone and petroleum ether, melts at about 210–213° C. The infrared absorption spectrum shows maxima at 2.96, 5.88, and 9.52 microns.

The identical compound is obtained by the treatment of cortisone with ethanedithiol and p-toluenesulfonic acid by the foregoing procedure.

Example 2

A solution of 464 parts of 17α-hydroxy-21-benzoyloxy-4-pregnene-3,11,20-trione in 10,000 parts of warm acetic acid is treated with 82 parts of ethanedithiol and a solution of 90 parts of p-toluenesulfonic acid monohydrate in 1000 parts of acetic acid. The reaction mixture is permitted to stand at 15° C. for 12 hours after which the precipitate is collected on a filter. There is thus obtained the 17α-hydroxy-21-benzoyloxy-4-pregnene-3,11,20-trione 3-ethylene mercaptole which has the structural formula

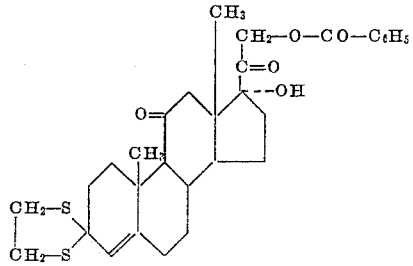

The infrared absorption spectrum shows maxima at 2.95, 5.88, 7.92, 8.92, 9.52, and 13.85 microns.

Example 3

A mixture of 78 parts of progesterone, 1320 parts of acetic acid, 26 parts of ethanedithiol and 25 parts of p-toluenesulfonic acid monohydrate is maintained at 25° C. for an hour and then poured into water. The reaction mixture is extracted with chloroform and the chloroform solution is washed successively with water, 5% sodium hydroxide solution and again with water. The extract is then dried over anhydrous calcium sulfate, filtered and evaporated to yield a solid residue. Crystallized from 2-propanol, it melts at about 169–181° C. This material is applied to a silica gel chromatography column. Elution with a 33% solution of petroleum ether in benzene yields a small quantity of a solid melting at about 179–181.5° C. Further elution with a 5% solution of ethyl acetate in benzene, evaporation of the eluate and recrystallization of the residue from ethyl acetate yields 4-pregnene-3,20-dione 3-ethylene mercaptole melting at about 184–186° C. The optical rotation of a 1% chloroform solution is $\alpha_D = +211°$.

Example 4

A solution of 11.64 parts of 17α-hydroxy-21-acetoxy-4-pregnene-3,20-dione in 263 parts of warm acetic acid is treated with 2.46 parts of ethanedithiol and a solution of 2.7 parts of p-toluenesulfonic acid monohydrate in 30 parts of acetic acid. After 17 hours standing at room temperature, the crystalline precipitate is collected on a filter and recrystallized from acetone. 17α-Hydroxy-21-acetoxy-4-pregnene-3,20-dione 3-ethylene mercaptole thus obtained melts at about 227–229° C. The rotation of a 1% chloroform solution is $\alpha_D = +154°$. The infrared absorption spectrum as determined in a potassium bromide disc shows maxima at 2.95, 5.80, 7.30, 7.92, 8.08, and 9.58 microns.

Example 5

A mixture of 100 parts of 17-hydroxycorticosterone acetate, 20.2 parts of ethanedithiol, 16.7 parts of p-toluenesulfonic acid monohydrate and 1750 parts of acetic acid is maintained at 10° C. for 12 hours, after which the precipitate is collected on a filter and recrystallized from acetone. 100 parts of the 11β,17α-dihydroxy-21-acetoxy-4-pregnene-3,20-dione 3-ethylene mercaptole thus obtained are dissolved in 4000 parts of 95% methanol. Over a period of 15 minutes one equivalent of an 0.1-N solution of sodium hydroxide in the methanol is added with shaking. The reaction mixture is permitted to stand at room temperature for 30 minutes and then concentrated under vacuum and cooled. The precipitated 11β,17α,21-trihydroxy-4-pregnene-3,20-dione 3-ethylene mercaptole is collected on a filter. Further purification can be achieved by chromatography on a silica column. The compound has the structural formula

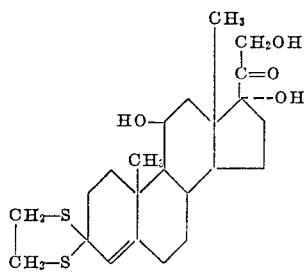

The infrared absorption spectrum shows maxima at 2.96, 5.86, and 9.52 microns.

Example 6

A mixture of 30 parts of 19-norprogesterone, 530 parts of acetic acid, 10.4 parts of ethanedithiol and 10 parts of p-toluenesulfonic acid monohydrate is stirred for an hour at 25° C. and then poured into water. The reaction mixture is extracted with chloroform and the chloroform extract is washed with water, 5% potassium hydroxide solution and again with water. After drying over anhydrous sodium sulfate and evaporation of the solvent, there is obtained 19-nor-4-pregnene-3,20-dione 3-ethylene mercaptole. This compound can be further purified by chromatography on silica gel by the procedure of Example 3.

Example 7

A mixture of 48.3 parts of the β-cyclopentylpropionate of 11-desoxycorticosterone, 8.2 parts of ethanedithiol, 9 parts of p-toluenesulfonic acid monohydrate and 1000 parts of acetic acid is stirred for 5 hours and then poured into water. The resulting suspension is extracted with chloroform. The extract is washed successively with water, 5% sodium hydroxide solution, and water. After drying over anhydrous sodium sulfate and evaporation of the solvent, one obtains as a residue 21-(β-cyclopentylpropionyloxy)-4-pregnene-3,20-dione 3-ethylene mercaptole which has the structural formula

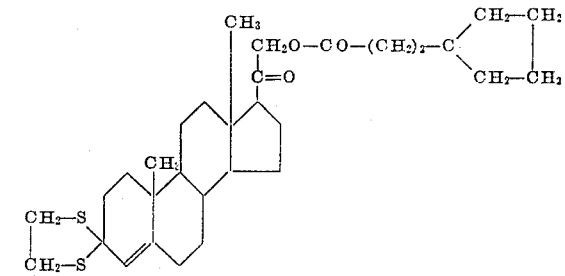

Example 8

A mixture of 302 parts of 11β-hydroxy-4-androstene-3,17-dione with 103 parts of ethanedithiol, 90 parts of p-toluenesulfonic acid monohydrate and 2650 parts of acetic acid is maintained at room temperature for an hour, poured into water and extracted with chloroform. The chloroform solution is washed with water, 5% aqueous sodium hydroxide solution and again with water. The extract is then dried over anhydrous sodium sulfate, filtered and evaporated to yield 11β-hydroxy-4-androstene-3,17-dione 3-ethylene mercaptole which, recrystallized from ethyl acetate, melts at about 247–2490 C.

Example 9

A suspension of 6 parts of 4-androstene-3,11,17-trione in 84 parts of acetic acid is treated with 2 parts of ethanedithiol in a solution of 3.6 parts of p-toluene-sulfonic acid monohydrate in 41 parts of acetic acid. Then the solution is poured into water. After standing at room temperature for 1 hour, a solid separates. Successive recrystallizations from aqueous methanol and a mixture of ethyl acetate and petroleum ether yields 4-androstene-3,-11,17-trione 3-ethylene mercaptole melting at about 164–

165° C. The optical rotation of a 1% acetone solution is $\alpha_D = +105°$.
I claim:
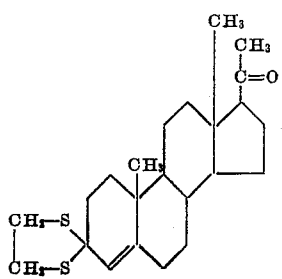
References Cited in the file of this patent
Antonucci: J. Org. Chem., October 1952, pp. 1341–1350.
Antonucci: J. Org. Chem., October 1952, pp. 1369–1374.
Hauptman: JACS, March 1947, vol. 69, 562–66.